United States Patent
Cheng (10) Patent No.: US 10,174,910 B2
(45) Date of Patent: Jan. 8, 2019

(54) METHOD FOR MAKING REFLECTIVE AND SELF-LUMINOUS SUBSTRATE

(71) Applicant: Bu Shang Enterprise Co., Ltd., Yuanlin Township, Changhua County (TW)

(72) Inventor: Chi-Chang Cheng, Yuanlin Township (TW)

(73) Assignee: Bu Shang Enterprise Co., Ltd., Yuanlin Township (TW)

(*) Notice: Subject to any disclaimer, the term of this patent is extended or adjusted under 35 U.S.C. 154(b) by 135 days.

(21) Appl. No.: 15/460,336

(22) Filed: Mar. 16, 2017

(65) Prior Publication Data

US 2018/0266660 A1 Sep. 20, 2018

(51) Int. Cl.
*B23P 25/00* (2006.01)
*F21V 9/30* (2018.01)
*A41D 13/01* (2006.01)
*A43C 9/00* (2006.01)
*A41D 1/04* (2006.01)
*A01K 27/00* (2006.01)
*B21D 53/88* (2006.01)

(52) U.S. Cl.
CPC .............. *F21V 9/30* (2018.02); *A01K 27/001* (2013.01); *A01K 27/006* (2013.01); *A41D 1/04* (2013.01); *A41D 13/01* (2013.01); *A43C 9/00* (2013.01); *B23P 25/00* (2013.01); *B21D 53/883* (2013.01); *Y10T 29/49885* (2015.01)

(58) Field of Classification Search
CPC ..... F21V 9/30; A41D 13/01; Y10T 29/49885; B21D 53/883; B23P 25/00; A01K 27/006
See application file for complete search history.

(56) References Cited

U.S. PATENT DOCUMENTS

| | | | | |
|---|---|---|---|---|
| 2,858,603 A | * | 11/1958 | Herrmann | B21D 53/883 29/424 |
| 4,534,619 A | * | 8/1985 | Bedford | G08B 5/004 2/338 |
| 5,698,301 A | * | 12/1997 | Yonetani | B32B 7/02 428/213 |
| 5,811,174 A | * | 9/1998 | Murakami | C09K 11/02 250/484.4 |
| 2003/0177561 A1 | * | 9/2003 | Sloot | A01K 11/00 2/16 |
| 2004/0143882 A1 | * | 7/2004 | Gardner | A41D 13/01 2/81 |

(Continued)

*Primary Examiner* — Jermie Cozart
(74) *Attorney, Agent, or Firm* — Alan D. Kamrath; Kamrath IP Lawfirm, P.A.

(57) ABSTRACT

A method includes pressing a macromolecular material to form a successive reflective layer, heating the reflective layer to a preset temperature value, stirring luminous powder and fluorescent powder at a high speed so that the luminous powder and the fluorescent powder are mixed evenly to form a luminous blank, evenly painting the luminous blank on the reflective layer, drying the luminous blank at a predetermined temperature value to form a luminous layer, and cooling the reflective layer and the luminous layer to produce a substrate which has reflective and self-luminous features. Thus, the luminous layer of the substrate emits light in a dark environment by reflection of the reflective layer of the substrate.

12 Claims, 10 Drawing Sheets

(56) References Cited

U.S. PATENT DOCUMENTS

2009/0159015 A1* 6/2009 Watson ................ A01K 27/006
　　　　　　　　　　　　　　　　　　　　　　119/858
2009/0165732 A1* 7/2009 Farley .................. A01K 27/001
　　　　　　　　　　　　　　　　　　　　　　119/858

* cited by examiner

METHOD FOR MAKING REFLECTIVE AND SELF-LUMINOUS SUBSTRATE

BACKGROUND OF THE INVENTION

1. Field of the Invention

The present invention relates to a method for making a reflective and self-luminous substrate and the application thereof

2. Description of the Related Art

A passive reflective device can reflect an external light source to provide a warning effect. The passive reflective device includes a reflective strip or plate which is made of hard material. In addition, the passive reflective device fails when the light source disappears. An active lighting device includes bulbs to provide a lighting function. However, the active lighting device is heavy and has a higher price. In addition, the active lighting device cannot be mounted on a clothing to provide a warning function. A luminous fabric includes photoconductive fibers to provide a lighting function. However, the luminous fabric only has a passive lighting function and cannot shine actively at the night, thereby affecting the user's safety. In addition, the photoconductive fibers are not resilient so that the luminous fabric cannot be mounted on a clothing.

BRIEF SUMMARY OF THE INVENTION

The primary objective of the present invention is to provide a method for making a reflective and self-luminous substrate that provides an active lighting function at the night.

In accordance with the present invention, there is provided a method for making a reflective and self-luminous substrate, comprising a first step of making a reflective layer, a second step of heating, a third step of making a luminous layer, and a fourth step of cooling. The first step includes pressing a macromolecular material by a calendar device to form a successive reflective layer which is transparent and has determined flexibility and elasticity. The second step includes placing and heating the reflective layer in a heating device during a time interval ranged from three to fifteen minutes to a preset temperature value. The third step includes a first substep of preparing material, a second substep of painting, and a third substep of drying. The first substep includes placing and stirring luminous powder and fluorescent powder in a stirrer at a high speed so that the luminous powder and the fluorescent powder are mixed evenly to form a luminous blank. The second substep includes evenly painting the luminous blank on the reflective layer. The third substep includes placing the reflective layer and the luminous blank in a dryer and drying the luminous blank at a predetermined temperature value to form a luminous layer which has luminous and fluorescent effect. The fourth step includes cooling the reflective layer and the luminous layer to produce a substrate including the reflective layer and the luminous layer. Thus, the substrate has reflective and self-luminous features. When a light source irradiates the luminous layer of the substrate, the luminous layer containing the luminous powder and the fluorescent powder can absorb light from the light source, so that when the light source disappears, the luminous layer of the substrate emits light locally or completely in a dark environment by reflection of the reflective layer of the substrate.

According to the primary advantage of the present invention, the luminous layer of the substrate emits light locally or completely in a dark environment by reflection of the reflective layer of the substrate so that the substrate provides an active lighting function under the dark condition so as to protect the user's safety.

According to another advantage of the present invention, the luminous layer of the substrate emits fluorescent light outward so that the substrate has a bright appearance to provide an outstanding indication or warning to a person, rider or driver passing by the substrate, thereby greatly enhancing the visible effect of the substrate at the night, and thereby decreasing the possibility of accidental danger.

Further benefits and advantages of the present invention will become apparent after a careful reading of the detailed description with appropriate reference to the accompanying drawings.

DETAILED DESCRIPTION OF THE INVENTION

Figure 1:
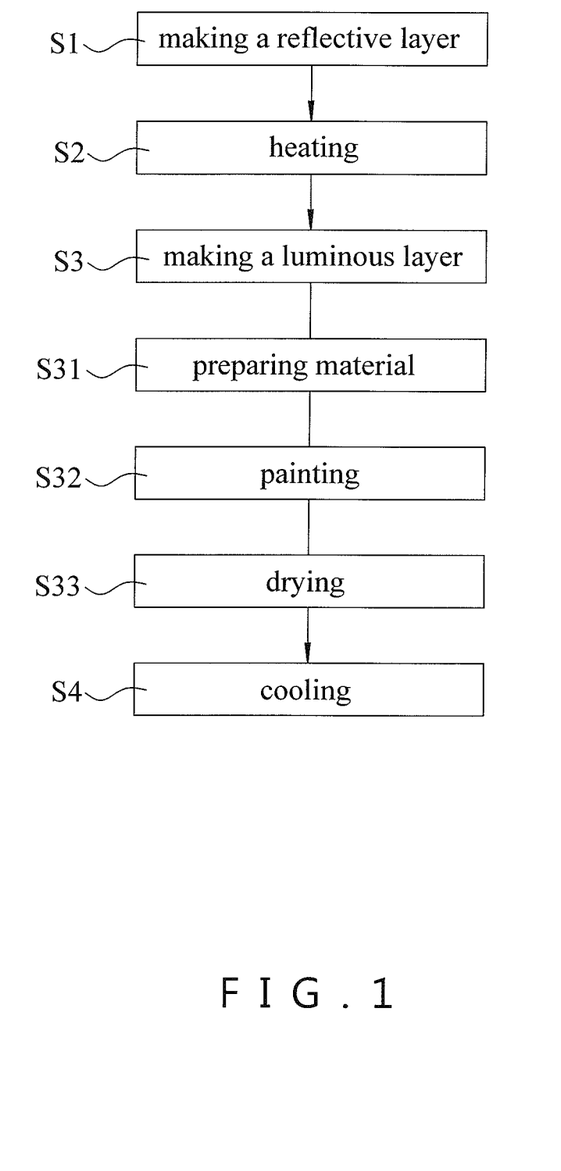
FIG. 1 is a flow chart of a method for making a reflective and self-luminous substrate in accordance with the preferred embodiment of the present invention.
Figure 2:
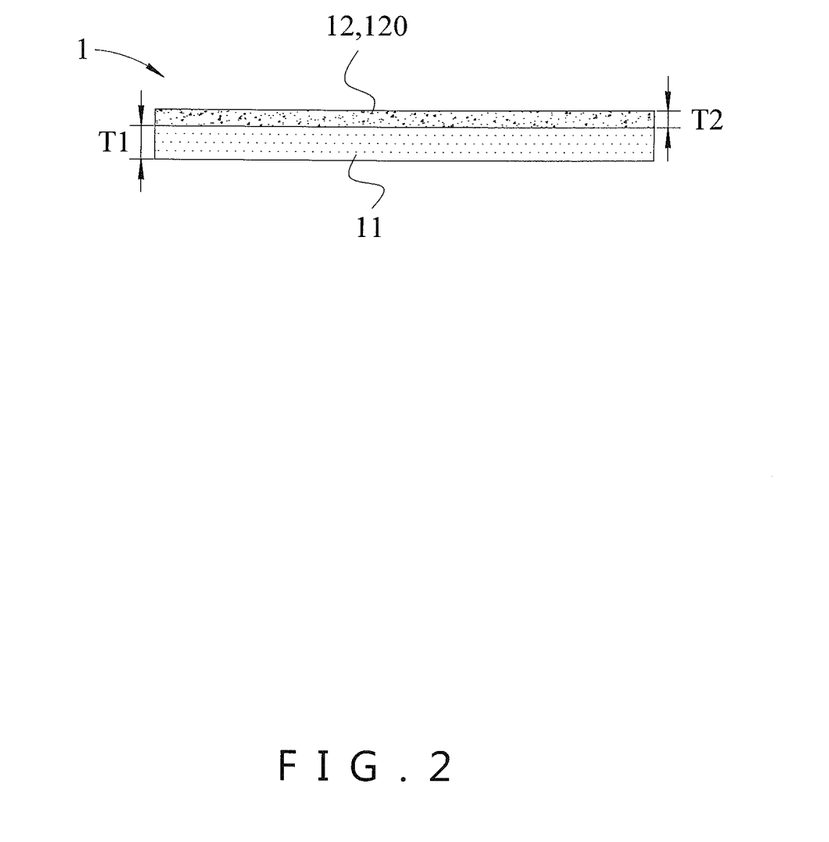
FIG. 2 is a schematic cross-sectional view of a reflective and self-luminous substrate in accordance with the preferred embodiment of the present invention.

Referring to the drawings and initially to FIGS. 1 and 2, a method for making a reflective and self-luminous substrate in accordance with the preferred embodiment of the present invention comprises a first step "S1" of making a reflective layer 11, a second step "S2" of heating, a third step "S3" of making a luminous layer 12, and a fourth step "S4" of cooling.

The first step "S1" includes pressing a macromolecular material by a calendar device to form a successive reflective layer 11 which is transparent and has determined flexibility and elasticity.

The second step "S2" includes placing and heating the reflective layer 11 in a heating device during a time interval ranged from three to fifteen (3-15) minutes to a preset temperature value. Optimally, the time interval for heating the reflective layer 11 is five minutes.

The third step "S3" includes a first substep "S31" of preparing material, a second substep "S32" of painting, and a third substep "S33" of drying.

The first substep "S31" includes placing and stirring luminous powder and fluorescent powder in a stirrer at a high speed so that the luminous powder and the fluorescent powder are mixed evenly to form a luminous blank 120.

The second substep "S32" includes evenly painting the luminous blank 120 on the reflective layer 11.

The third substep "S33" includes placing the reflective layer 11 and the luminous blank 120 in a dryer and drying the luminous blank 120 at a predetermined temperature value to form a luminous layer 12 which has luminous and fluorescent effect.

The fourth step "S4" includes cooling the reflective layer 11 and the luminous layer 12 to produce a substrate 1 including the reflective layer 11 and the luminous layer 12. Thus, the substrate 1 has reflective and self-luminous features.

In such a manner, when a light source irradiates the luminous layer 12 of the substrate 1, the luminous layer 12 containing the luminous powder and the fluorescent powder can absorb light from the light source, so that when the light source disappears, the luminous layer 12 of the substrate 1 emits light locally or completely in a dark environment by reflection of the reflective layer 11 of the substrate 1. In addition, the luminous layer 12 of the substrate 1 emits fluorescent light outward to provide an outstanding warning effect to a person passing by the substrate 1, thereby greatly enhancing the visible feature of the substrate 1 at the night, and thereby decreasing the possibility of accidental danger.

In the preferred embodiment of the present invention, the luminous layer 12 has a thickness "T2" smaller than a thickness "T1" of the reflective layer 11. Preferably, the thickness "T2" of the luminous layer 12 is ranged between 15 mm and 25 mm, and the thickness "T1" of the reflective layer 11 is ranged between 25 mm and 35 mm.

In the preferred embodiment of the present invention, the first substep "S31" of the third step "S3" further includes adding pigment into the luminous blank 120 and stirring the luminous blank 120 in the stirrer at a high speed so that the luminous blank 120 and the pigment are mixed evenly, and the luminous blank 120 presents colors.

In the preferred embodiment of the present invention, in the second substep "S32" of the third step "S3", the luminous blank 120 is painted on an upper surface of the reflective layer 11 so that the luminous layer 12 is located at the upper surface of the reflective layer 11.

Referring to FIG. 2, the reflective layer 11 has a flat face, and the luminous layer 12 has a flat face. In addition, the macromolecular material of the reflective layer 11 is selected from TPE, TPR, EVA, NR, SR, PU, PVC, TPU OR SILICONE.

Figure 3:
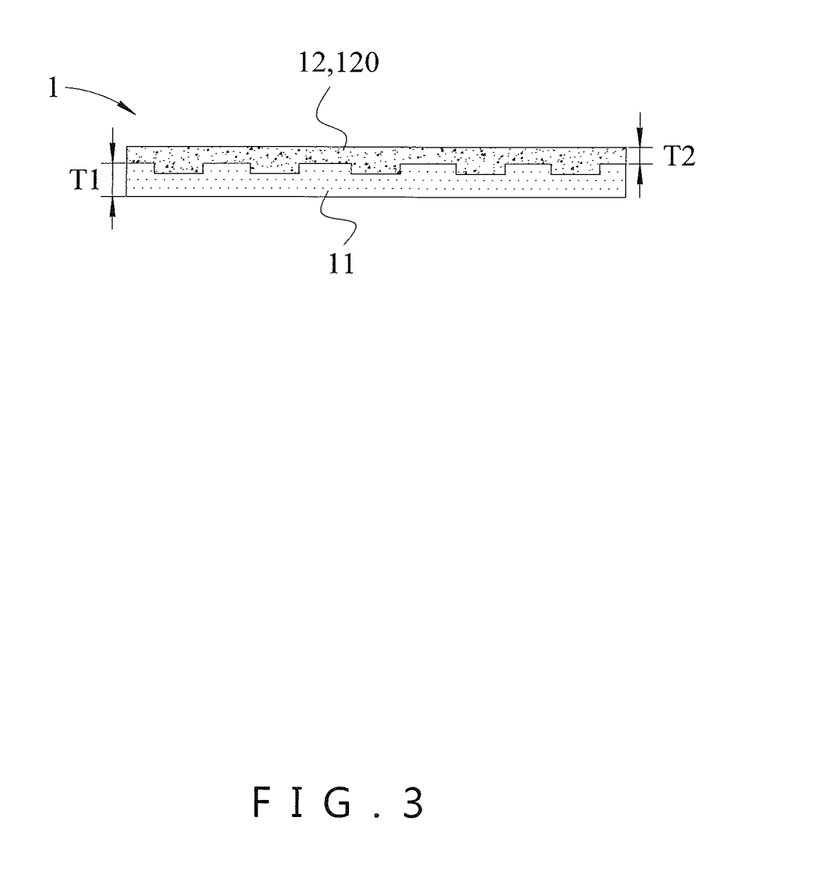
FIG. 3 is a schematic cross-sectional view of a reflective and self-luminous substrate in accordance with another preferred embodiment of the present invention.

Referring to FIG. 3, the reflective layer 11 has convex and concave faces, and the luminous layer 12 has convex and concave faces. It is appreciated that, when the reflective layer 11 has convex and concave faces, the thickness "T2" of the luminous layer 12 has a greater value, so that when the light source irradiates the substrate 1, the luminous layer 12 better luminous and fluorescent effects. Thus, when the light source disappears, the luminous layer 12 of the substrate 1 emits brighter colorful light in the dark environment by reflection of the reflective layer 11.

Figure 4:
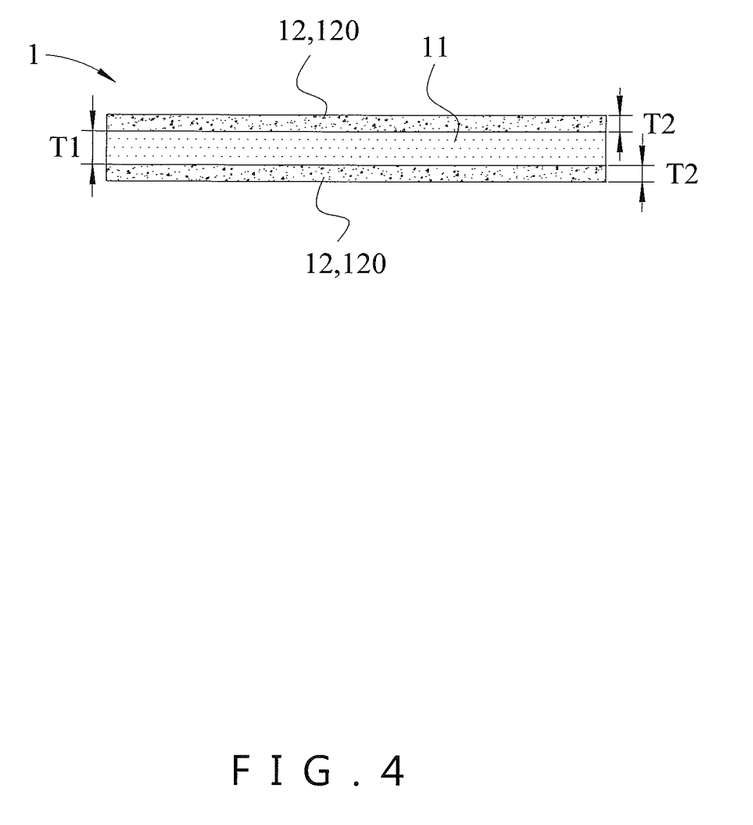
FIG. 4 is a schematic cross-sectional view of a reflective and self-luminous substrate in accordance with another preferred embodiment of the present invention.
Figure 5:
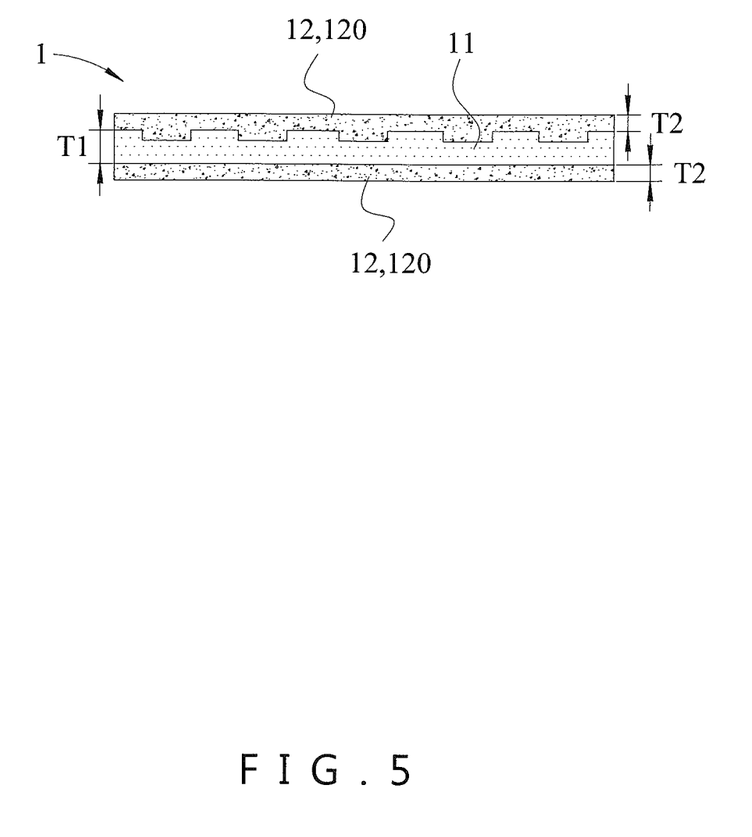
FIG. 5 is a schematic cross-sectional view of a reflective and self-luminous substrate in accordance with another preferred embodiment of the present invention.
Figure 6:
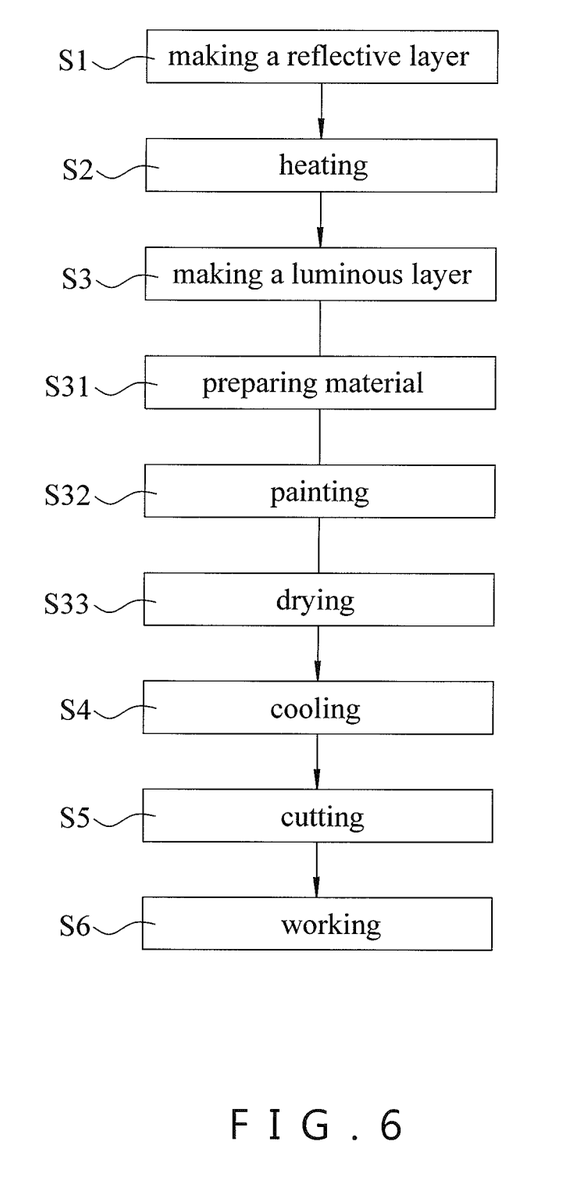
FIG. 6 is a flow chart of a method for making a reflective and self-luminous product in accordance with the preferred embodiment of the present invention.
Figure 7:
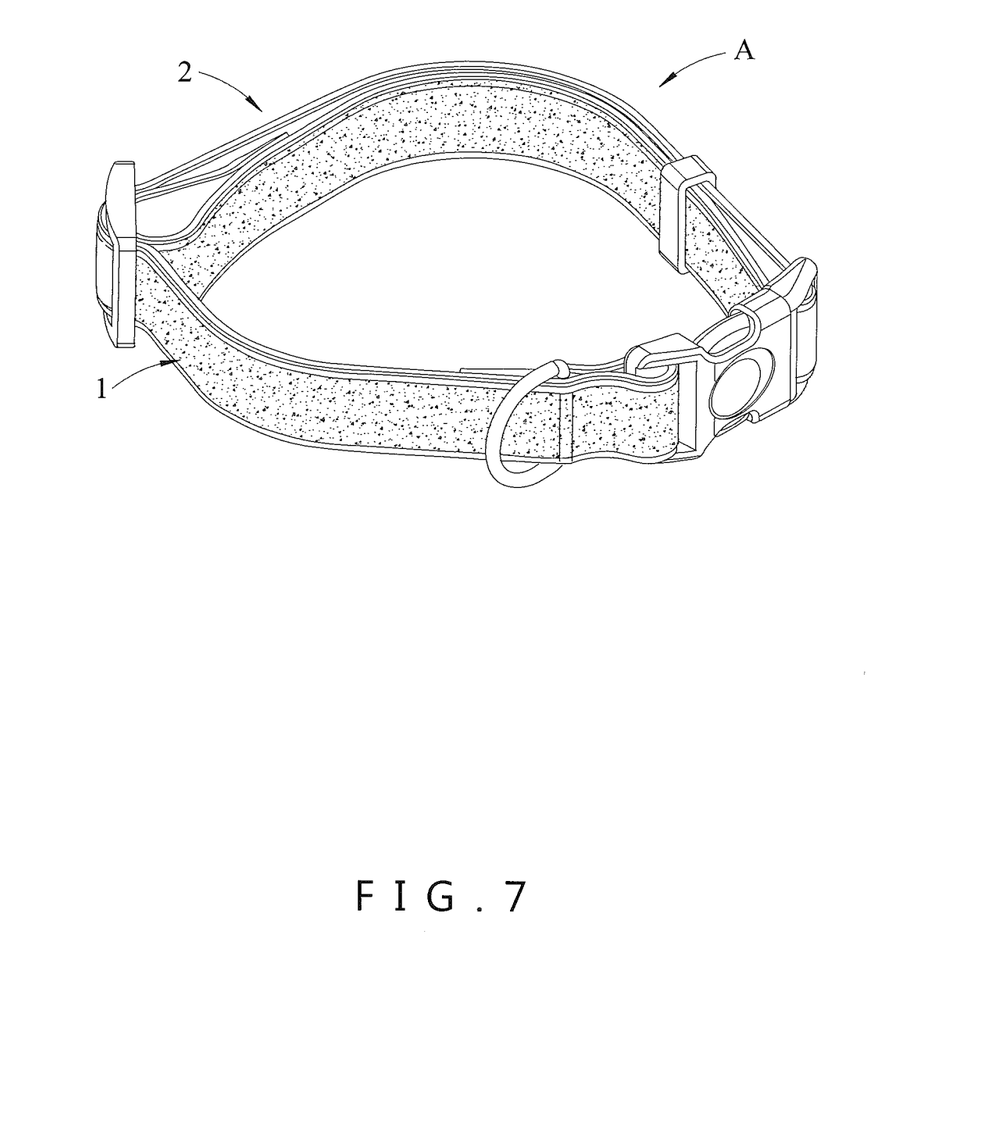
FIG. 7 is a perspective view of a reflective and self-luminous product in accordance with the preferred embodiment of the present invention.
Figure 8:
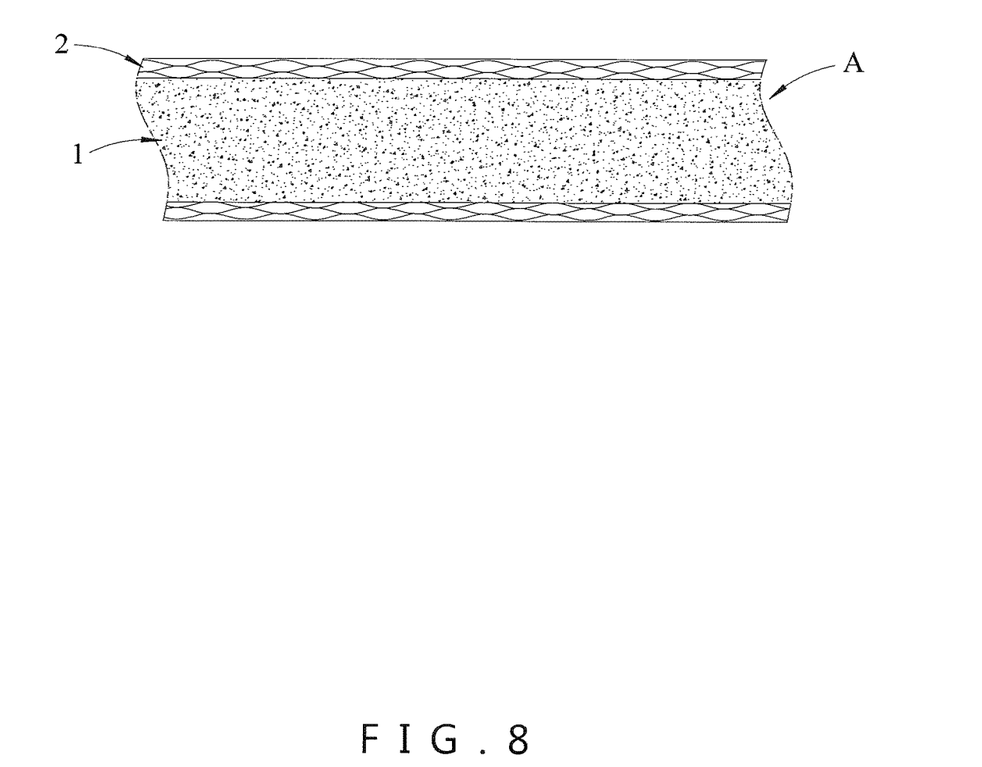
FIG. 8 is a schematic cross-sectional view of a reflective and self-luminous product in accordance with another preferred embodiment of the present invention.
Figure 9:
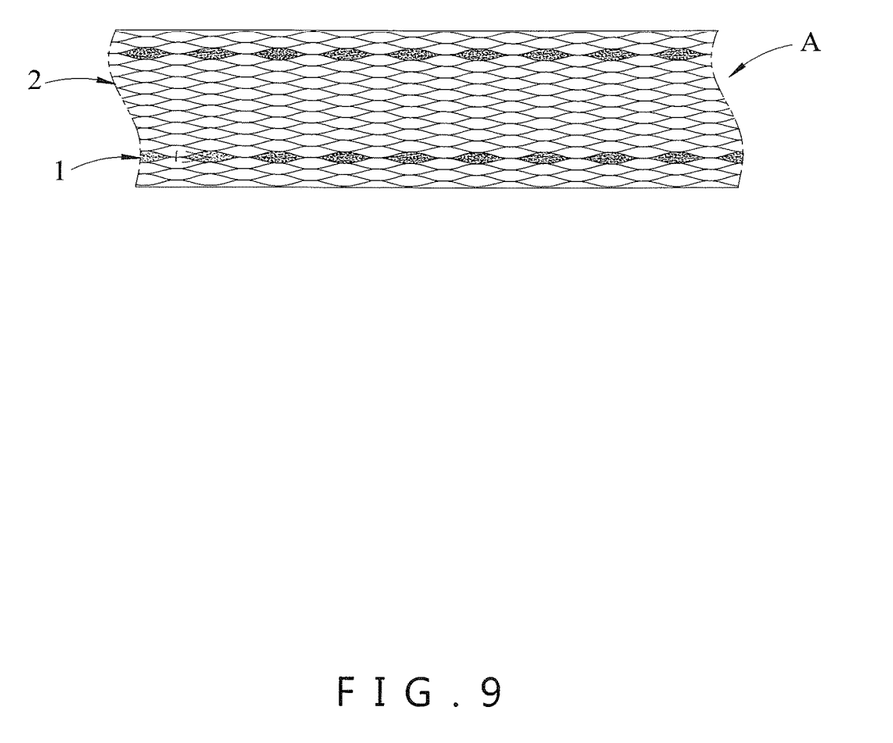
FIG. 9 is a schematic cross-sectional view of a reflective and self-luminous product in accordance with another preferred embodiment of the present invention.
Figure 10:
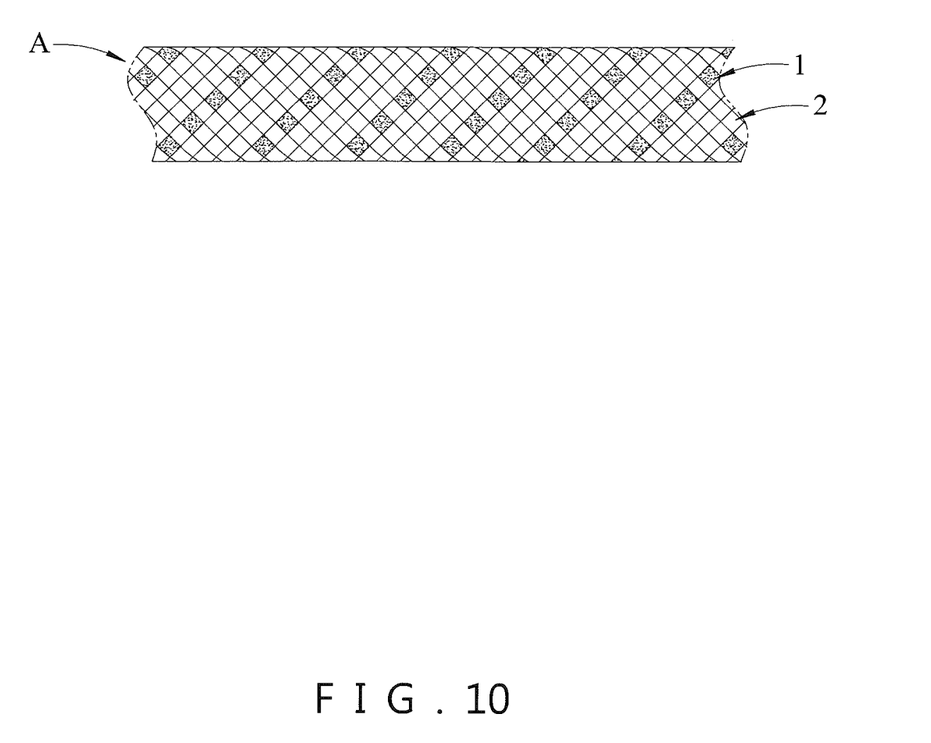
FIG. 10 is a schematic cross-sectional view of a reflective and self-luminous product in accordance with another preferred embodiment of the present invention.

Referring to FIGS. 4 and 5, the luminous blank 120 is painted on an upper surface and a lower surface of the reflective layer 11 so that the luminous layer 12 is located at the upper surface and the lower surface of the reflective layer 11.

Referring to FIGS. 6-10, the method in accordance with the preferred embodiment of the present invention further comprises a fifth step "S5" of cutting and a sixth step "S6" of working. The fifth step "S5" includes cutting the substrate 1 to have determined length and width. The sixth step "S6" includes working and combining the substrate 1 with an object 2 to form a product "A" which has reflective and self-luminous features. Preferably, the substrate 1 is secured to the object 2 by high frequency hot pressing or by knitting. Alternatively, the object 2 includes a plurality of lines, and the substrate 1 interweaves with the lines of the object 2 to form the product "A". Preferably, the object 2 is a pet strap (see FIG. 7), a weaving strap (see FIGS. 8 and 9), a vest, a clothing or traffic equipment. Preferably, the product "A" is a cord (see FIG. 10), a shoelace, a weaving strap or a pet strap.

Accordingly, the luminous layer 12 of the substrate 1 emits light locally or completely in a dark environment by reflection of the reflective layer 11 of the substrate 1 so that the substrate 1 provides an active lighting function under the dark condition so as to protect the user's safety. In addition, the luminous layer 12 of the substrate 1 emits fluorescent light outward so that the substrate 1 has a bright appearance to provide an outstanding indication or warning to a person, rider or driver passing by the substrate 1, thereby greatly enhancing the visible effect of the substrate 1 at the night, and thereby decreasing the possibility of accidental danger.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A method for making a reflective and self-luminous substrate, comprising:
   a first step of making a reflective layer;
   a second step of heating;
   a third step of making a luminous layer; and
   a fourth step of cooling;
   wherein:
   the first step includes pressing a macromolecular material by a calendar device to form a successive reflective layer which is transparent and has determined flexibility and elasticity;
   the second step includes placing and heating the reflective layer in a heating device during a time interval ranged from three to fifteen minutes to a preset temperature value;
   the third step includes:
   a first substep of preparing material;
   a second substep of painting; and
   a third substep of drying;
   the first substep includes placing and stirring luminous powder and fluorescent powder in a stirrer at a high speed so that the luminous powder and the fluorescent powder are mixed evenly to form a luminous blank;
   the second substep includes evenly painting the luminous blank on the reflective layer;

the third substep includes placing the reflective layer and the luminous blank in a dryer and drying the luminous blank at a predetermined temperature value to form a luminous layer which has luminous and fluorescent effect;

the fourth step includes cooling the reflective layer and the luminous layer to produce a substrate including the reflective layer and the luminous layer;

the substrate has reflective and self-luminous features; and when a light source irradiates the luminous layer of the substrate, the luminous layer containing the luminous powder and the fluorescent powder can absorb light from the light source, so that when the light source disappears, the luminous layer of the substrate emits light locally or completely in a dark environment by reflection of the reflective layer of the substrate.

2. The method of claim 1, wherein the reflective layer has a flat face, and the luminous layer has a flat face.

3. The method of claim 1, wherein the reflective layer has convex and concave faces, and the luminous layer has convex and concave faces.

4. The method of claim 1, wherein in the second substep of the third step, the luminous blank is painted on an upper surface of the reflective layer so that the luminous layer is located at the upper surface of the reflective layer.

5. The method of claim 1, wherein the luminous blank is painted on an upper surface and a lower surface of the reflective layer so that the luminous layer is located at the upper surface and the lower surface of the reflective layer.

6. The method of claim 1, wherein:
the luminous layer has a thickness smaller than a thickness of the reflective layer;
the thickness of the luminous layer is ranged between 15 mm and 25 mm; and
the thickness of the reflective layer is ranged between 25 mm and 35 mm.

7. The method of claim 1, wherein the first substep of the third step further includes:
adding pigment into the luminous blank; and
stirring the luminous blank in the stirrer at a high speed so that the luminous blank and the pigment are mixed evenly, and the luminous blank presents colors.

8. The method of claim 1, further comprising:
a fifth step of cutting the substrate to have determined length and width; and
a sixth step of working and combining the substrate with an object to form a product which has reflective and self-luminous features.

9. The method of claim 8, wherein the substrate is secured to the object by high frequency hot pressing or by knitting.

10. The method of claim 8, wherein the object is a pet strap, a weaving strap, a vest, a clothing or traffic equipment.

11. The method of claim 8, wherein the object includes a plurality of lines, and the substrate interweaves with the lines of the object to form the product.

12. The method of claim 8, wherein the product is a cord, a shoelace, a weaving strap or a pet strap.

\* \* \* \* \*